United States Patent

[11] 3,598,457

[72] Inventor Arthur W. Sejeck
 Kirtland, Ohio
[21] Appl. No. 38,041
[22] Filed May 18, 1970
 Division of Ser. No. 568,838, July 29, 1966,
 Pat. No. 3,521,559
[45] Patented Aug. 10, 1971
[73] Assignee Addressograph Multigraph Corporation
 Cleveland, Ohio

[54] ROLL MOUNTING
 8 Claims, 3 Drawing Figs.
[52] U.S. Cl. .................................................. 308/22
[51] Int. Cl. .................................................. F16c 13/00
[50] Field of Search ........................................ 308/122,
 24, 75, 20, 236

[56] References Cited
 UNITED STATES PATENTS
 2,513,643 7/1950 Griner ........................ 308/24

Primary Examiner—Martin P. Schwadron
Assistant Examiner—Frank Susko
Attorneys—Russell L. Root and Ray S. Pyle ABSTRACT: Rotary offset lighographic duplicators have various rolls, especially the rolls of the ink system for example, which require removal from time to time for purposes of cleaning or replacement. According to the invention there are provided mountings for such rolls permitting ready removal and replacement, including coaxial stub shaft supports, one suitably mounted at each sideplate of the machine and having a half-socket head at its inner end. The half sockets receive roller bearings on the ends of the roll shaft, and the bearings are clamped in place by caps, one captive on each end of the roll shaft, and by connecting screws fastening each cap to its respective half socket. Means are provided for adjusting the stub shafts in a transaxial direction so as to set the proper degree of contact between the removable roll and its adjacent roll to accommodate slight variations in roll diameter, and to adjust to exact parallelism.

PATENTED AUG 10 1971 3,598,457

ARTHUR W. SEJECK
INVENTOR.

BY Russell L. Root
ATTORNEY.

ROLL MOUNTING

This application is a division of copending application, Ser. No. 568,838, filed July 29, 1966 now U.S. Pat. No. 3,521,559, issued July 21, 1970.

In duplicators, and in many other rotary sheet treating machines, there are plural parallel rolls which run in mutual contact. It is frequently the case that one or more of these rolls works under conditions such that removal now and then is desirable either for reconditioning or replacement.

The present invention has for its object the provision of mountings for such a roll of a character permitting ready removal of the roll in a radial or transaxial direction in a much simplified manner, and providing suitable means for adjusting the axis position of any roll thus mounted to permit it to lie in proper cooperative contact with adjacent rolls.

In particular the roll mounting is in the form of two coaxial stub shafts each provided with a half socket which will accept bearings on the ends of the roll shaft. Each end of the roll shaft also carries a captive cap which can be fastened to the corresponding half socket to clamp the associated bearing when the roll is in place, and hold it firmly in position.

Other objects, features and advantages will appear hereinafter as the description proceeds.

IN THE DRAWING

Figure 1:
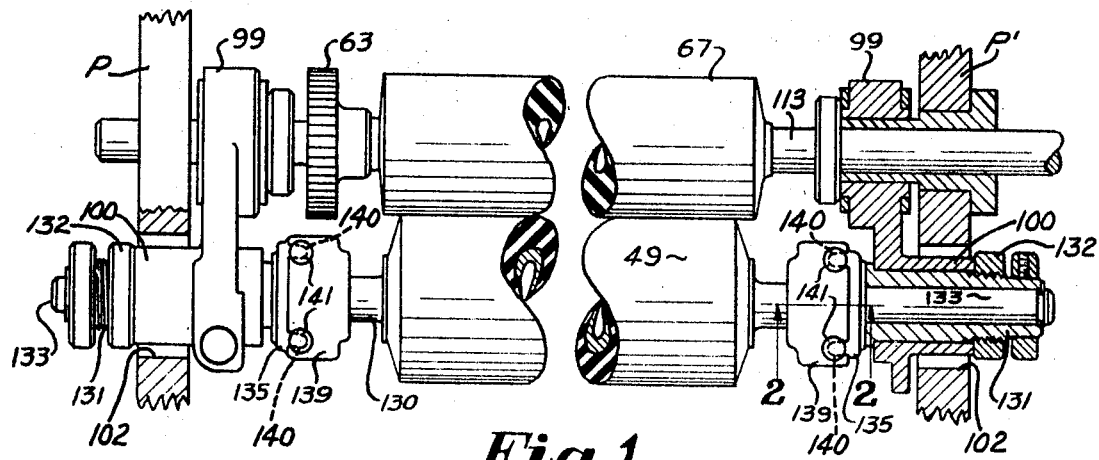
FIG. 1 is an elevation, partly in section of a portion of a parallel roll sheet treating machine showing the roll-mounting means of the present invention.

Referring to the drawings, FIG. 1 illustrates a parallel roll sheet treating machine, and in the form shown is actually the mounting for two of the rolls of the ink system in a lithographic duplicator. The frame of the machine includes parallel sideplates P and P' which rotatably mount between them the shaft 113 of an inkroll 67, which may be driven by means of an integral gear 63 in any well-known manner.

Running in contact with the roll 67 is a form roll 49 designed to take ink from the roll 67 and apply it to the surface of a lithographic master on a master cylinder (not shown). It is this form roll 49 which requires rather frequent removal for cleaning, trueing or replacement, and which is mounted in accordance with the principles of the present invention.

Since, in the normal operation of a duplicator, the form roll 49 must be moved into and out of contact with the surface of a master, it is preferably mounted in swingable arms 99 which are mounted to pivot about the axis of shaft 113, and each includes a hollow boss 100 which projects into and moves freely within a slot 102 in its respective sideplate P or P'.

Figure 2:
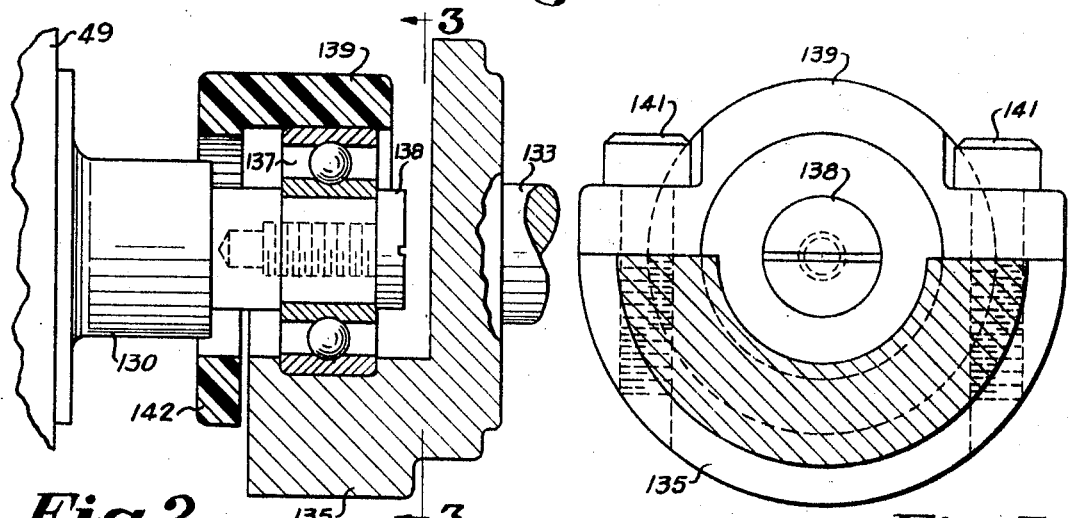
FIG. 2 is a detail section showing the roll mounting to a larger scale and taken substantially on line 2-2 of FIG. 1.
Figure 3:
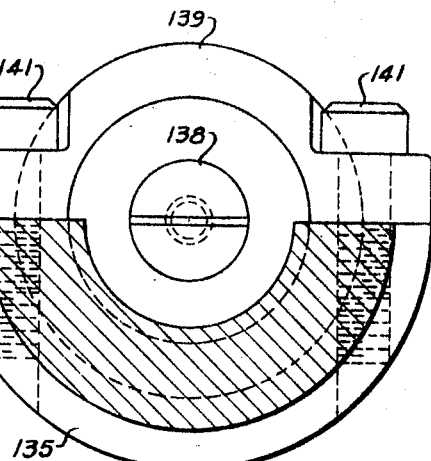
FIG. 3 is a detail section taken on line 3-3 of FIG. 2.

As for the mounting of the roll 49, it will be noted that it is actually provided with a shaft 130 which is short enough to be received not only between the sideplates, but also between the arms 99. In the boss 100 of each of the arms 99 is clamped, by a nut 132, a bushing 131 which has an eccentric opening in which is rotatably carried a short shaft segment or stub shaft 133 with a half-socket head 135 projecting inwardly from the respective arm 99. It can be seen, especially in FIGS. 2 and 3, that a roller bearing 137 is mounted on each end of the roll shaft 130, as by a screw 138, and each bearing is received in one of the half sockets 135. To hold the bearing tightly in the half socket, a cap 139, preferably of plastic material, is attached to each half socket by screws 141 which pass through openings in the cap as will be seen in FIG. 1. These openings are in the form of axial slots 140 with axially outwardly directed open ends. As can be seen from FIG. 2, the cap 139 is designed to be retained captive upon the roll 49 since a ring 142 with which it is provided has its inside diameter smaller than the outside diameter of the bearing 137, and hence the cap cannot be removed once the bearing is fastened in place.

Whenever it is desired to clean or change form rolls, it is only necessary to loosen screws 141 slightly, slide both caps 139 towards the roll 49 until the ends of the slots 140 in the caps 139 clear the screwheads, and then lift the assembly free of the half sockets. A form roll is installed by merely reversing the process.

Rotation of the clampable eccentric bushings 131 provides an adjustment for bringing the form roller into parallelism and uniform pressure contact with the surface of roll 67.

From the foregoing description, it can be seen that this invention provides a means whereby a roll may be readily removed from a machine without dismantling any part of the machine, and the process produces no free detached parts to be lost before the operator is ready to reinstall the roll or to install a replacement therefor.

In addition, the invention provides an improved roll mounting providing, both jointly and individually, means to mate the roll with a second roll so as to have peripheral motion about the second roll, and means to provide independent radial adjustment of the ends of the roll with respect to the second roll so as to secure parallelism and proper surface contact.

While a preferred embodiment of the invention has been described and illustrated, it is to be understood that this is capable of variation and modification. Accordingly, the aim in the appended claims is to cover all such variations and modifications as may fall within the true spirit of the invention.

I claim:

1. In a machine embodying a frame having sideplates, and a roll mounted with its axis extending transversely of and between the sideplates, and supported between the same, means for mounting the roll for ready removal and replacement comprising:

support means mounted adjacent each sideplate and each comprising a half-socket member opening towards the opposite sideplate;

a shaft integrally associated with said roll, said shaft being of a length such that its ends can be simultaneously received in said half-socket members;

bearing means mounted on each end of the roll shaft and receivable in one of the half-socket members;

a mating cap member releasably secured to each half-socket member to hold the bearing in firm engagement therewith; and fastening means for positively retaining the bearing means on the shaft when the roll is removed from the machine but readily releasable to permit removal of the bearing means from the shaft as desired.

2. A machine as set forth in claim 1 in which each cap member is trapped on its shaft end by the associated bearing means.

3. A machine as set forth in claim 2 in which the trapping of each cap member is accomplished by a ring formed integrally with the cap member and whose internal diameter is smaller than the external diameter of the associated bearing means.

4. A machine as set forth in claim 1 in which the fastening means includes an axial screw-threaded into the end of the shaft.

5. A machine as set forth in claim 1 in which the means for securing each cap member to its corresponding half-socket member comprises a pair of headed screws threaded into one of the members and engaging in slots in the other member, said slots being open ended in a direction to permit axial disengagement of the slotted member from beneath the screwheads by merely loosening the screws and relatively shifting the members in an axial direction.

6. A machine as set forth in claim 3 in which the means for securing each cap member to its corresponding half-socket member comprises a pair of headed screws threaded into one of the members and engaging in slots in the other member, said slots being open ended in a direction to permit axial disengagement of the slotted member from beneath the screwheads by merely loosening the screws and relatively shifting the members in an axial direction.

7. A machine as set forth in claim 1 in which the roll is intended to coact accurately with a surface adjacent thereto, and in which the support means includes:
- a stub shaft integrally connected to each half socket;
- a hollow boss surrounding said stub shaft; and
- a bushing capable of rotation in said boss, clampable in selected rotary positions, and formed with an eccentric bore receiving said stub shaft, whereby the position of the roll axis with respect to the coacting surface can be precisely set.

8. A machine as set forth in claim 7 in which the coacting surface is a second roll having a fixed axis, and wherein the support means includes arms pivoted on the axis of the second roll and formed with the hollow bosses each receiving one of said stub shafts and one of said bushings.